(12) United States Patent
Chan

(10) Patent No.: US 8,973,359 B2
(45) Date of Patent: Mar. 10, 2015

(54) FLOATING WAVE POWERED GENERATOR

(71) Applicant: Man Wai Chan, Hong Kong (HK)

(72) Inventor: Man Wai Chan, Hong Kong (HK)

( * ) Notice: Subject to any disclaimer, the term of this patent is extended or adjusted under 35 U.S.C. 154(b) by 15 days.

(21) Appl. No.: 14/051,498

(22) Filed: Oct. 11, 2013

(65) Prior Publication Data

US 2014/0375058 A1    Dec. 25, 2014

(30) Foreign Application Priority Data

Jun. 24, 2013 (CN) .......................... 2013 1 0254388

(51) Int. Cl.
    *F03B 13/14*     (2006.01)
    *F03B 13/18*     (2006.01)

(52) U.S. Cl.
    CPC ...................................... *F03B 13/18* (2013.01)
    USPC .......................................................... 60/495

(58) Field of Classification Search
    USPC .......................................................... 60/495
    See application file for complete search history.

(56) References Cited

U.S. PATENT DOCUMENTS

| | | | | |
|---|---|---|---|---|
| 3,231,749 | A * | 1/1966 | Hinck, III | 290/53 |
| 4,266,143 | A * | 5/1981 | Ng | 290/53 |
| 4,423,334 | A * | 12/1983 | Jacobi et al. | 290/53 |
| 7,453,165 | B2 * | 11/2008 | Hench | 290/53 |
| 2012/0227485 | A1 * | 9/2012 | Gregory | 73/460 |

FOREIGN PATENT DOCUMENTS

| | | | | |
|---|---|---|---|---|
| CN | 201730729 | U | * | 2/2011 |
| FR | 2356016 | A | * | 2/1978 |
| FR | 2523654 | A | * | 9/1983 |
| GB | 297720 | A | * | 6/1927 |
| KR | 650793 | B1 | * | 11/2006 |
| TW | 201107593 | A | * | 3/2011 |
| WO | WO 2014089983 | A1 | * | 6/2014 |

OTHER PUBLICATIONS

International Search Report issued by the State Intellectual Property Office of P. R. C. in connection with PCT Application No. PCT/CN2013/085248 on Mar. 20, 2014.

\* cited by examiner

*Primary Examiner* — Joseph Waks

(57) ABSTRACT

A wave powered generating device includes a floating vessel with onboard pendulum mechanism, an anchor with a mooring chain connected with the vessel, a lever arm, an upstanding post having a tip connected with the lever arm and a foot coupled with a universal coupler, a pendulum moveably mounted on the lever arm being erected above a platform deck of the vessel by the upstanding post, a gear mechanism incorporating with a centrifugal flywheel coupled with the universal coupler via a transmission mechanism for delivery of momentum of the pendulum, and a power generating mechanism driven by the gear mechanism. Under undulating waves, the pendulum, being mounted on the lever arm, sways laterally around an axis of the upstanding post, causing the upstanding post to rotate hence delivering the momentum of the pendulum to drive the power generating mechanism via a transmission shaft and the gear mechanism.

14 Claims, 10 Drawing Sheets

FLOATING WAVE POWERED GENERATOR

FIELD OF THE TECHNOLOGY

The present application relates generally to a power generator, and particularly to a floating wave powered generator that harnesses energy in undulating waves for power generation.

BACKGROUND

Wave energy is enormous, abundant and inexhaustive over the world. As such, people have been trying to harness energy in waves by all means. There are thousands of floating wave powered generator projects, however, most of them are inapplicable on account of: 1. Huge investment costs while equipment prone to damage by big waves thereby rendering high uncertainty risks, 2. Expensive maintenance and running costs due to sea water corrosion, growth of bio-organisms, wear and tear to hinges and bearings, water proof seals, piston rams and structural parts etc. 3. Unreliable power output due to reasons depicted in items 1 and 2 above. There are several known wave powered generator projects but they can only be operated in subsidizes from governments. Presumably, they are still in experimental stages due to major technical problems yet to be resolved and none of them can be viable in commercial application worldwide. Wave powered generators can operate when sufficient wave amplitudes have been reached and none of them can work on relatively tranquil water surfaces over lakes, rivers and marshes.

SUMMARY

According to one aspect, there is provided a wave power generating device including a floating vessel with an onboard pendulum mechanism, an anchor with a mooring chain connected with the vessel, a lever arm, an upstanding post having a tip connected with the lever arm and a foot coupled with a universal coupler, a pendulum free to slide mounted on the lever arm being erected above a platform deck of the vessel by the upstanding post, a gear mechanism incorporating with a centrifugal flywheel coupled with the universal coupler via a transmission mechanism for delivery of momentum of the pendulum, and a power generating mechanism driven by the gear mechanism. Under undulating waves, the pendulum, being mounted on the lever arm, sways laterally around an axis of the upstanding post, causing the upstanding post to rotate, hence delivering the momentum of the pendulum to drive the power generating mechanism via a transmission shaft and the gear mechanism. The centrifugal flywheel responds and accelerates more promptly with much less mechanical wear than traditional flywheels.

The wave power generating device may serve as a buoy to provide power to a mooring ship. The wave power generating device can also be operable onboard to provide incessant power supply to a ship at all times during cruising or mooring.

According to one embodiment, the freely mounted pendulum is composed of stackable counter weights to adjust the momentum output.

According to one embodiment, the wave power generating device may include a plurality of pendulums each mounted on a lever arm being erected above the platform deck by respective upstanding post. The upstanding posts are distributed over the platform deck at furthest distance from a central pivotal point of the vessel for maximum displacement of the pendulums to enhance efficiency in harnessing wave energy.

According to one embodiment, the heights of neighboring upstanding posts and lengths of respective lever arms may be different from each other to avoid lever arms clashing with each other as pendulums sway seeking for lowest center of gravity under undulating waves.

According to one embodiment, the power generating mechanism includes an electrical generator directly coupled with an output shaft of the gear mechanism.

According to one embodiment, the power generating mechanism includes a hydraulic pump coupled with an output shaft of the gear mechanism to drive a hydraulic turbine for power generation.

According to one embodiment, the vessel is semi-spherical in shape for larger area of contact with waves for operation in non-freezing water to harness more wave energy. According to another embodiment, the vessel is in shape of a segmented sphere for minimal water resistance for operation in region where water surface may be frozen in winter such that the vessel can sway in freezing water up to the last moment till water is deadly frozen.

According to one embodiment, the anchor is secured to the seabed and one free end of the mooring chain is split into two sub chains connecting to two pivotal points at the two opposite sides of the vessel respectively along an axis around which the vessel sways such that the mooring chain imposes minimal interference to the swaying movement of the vessel for maximum power output.

According to one embodiment, the wave power generating device includes a plurality of floating vessels inter-connected via a chain to form a large scale power generating system.

BRIEF DESCRIPTION OF THE DRAWINGS

Below is a description of the present application with combination of the drawings and embodiments, in the drawings.

DETAILED DESCRIPTION

In order to have a better understanding on the technical feature, purpose and effect of the present application, below is a detail description of the specific embodiments of the present application with reference to the drawings.

Figure 1:
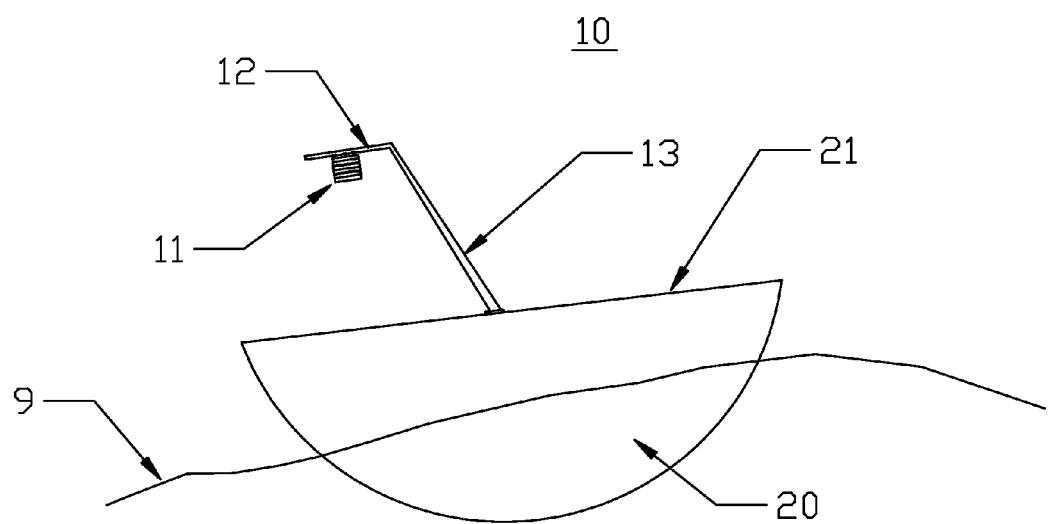
FIG. 1 is an illustrative diagram of a floating wave powered generator vessel with a single pendulum mechanism according to an embodiment of the present application.

FIG. 1 is an illustrative diagram of a floating wave powered generator vessel according to an embodiment of the present application comprising: a vessel 20 and its platform deck 21, an upstanding post 13 with an extended lever arm 12 carrying a pendulum 11 which can slide on lever arm 12. In undulating waves 9, vessel 20 sways up and down thereby changing the center of gravity of pendulum 11 continuously. In the course of pendulum 11 seeking for lowest center of gravity, its momentum causes lever arm 12 to sway laterally relatively to the axis of the up right post 13. The momentum of pendulum 11, a combination of kinetic energy and potential difference, is then delivered to drive an electrical generator 6 or a hydraulic pump 51 beneath platform deck 21 for power generation. The floating wave powered generator vessel 20 of the present application may serve as an independent floating wave powered generator or a buoy capable of providing power supply to a mooring ship.

FIGS. 2 to 5 are illustrative diagrams of a first embodiment of the floating wave powered generator vessel 20 in the present application. In this embodiment, pendulum 11 being free to move on lever arm 12 to control output torque, may include a plurality of stackable, adjustable and moveable counterweights hung onto lever arm 12 extended from a tip of the upstanding post 13 erected above platform deck 21. The axis of the upstanding post 13 around which pendulum 11 rotates may incline slightly towards a vertical axis of the vessel 20 such that pendulum 11 always leans inward in neutral condition.

Figure 2:
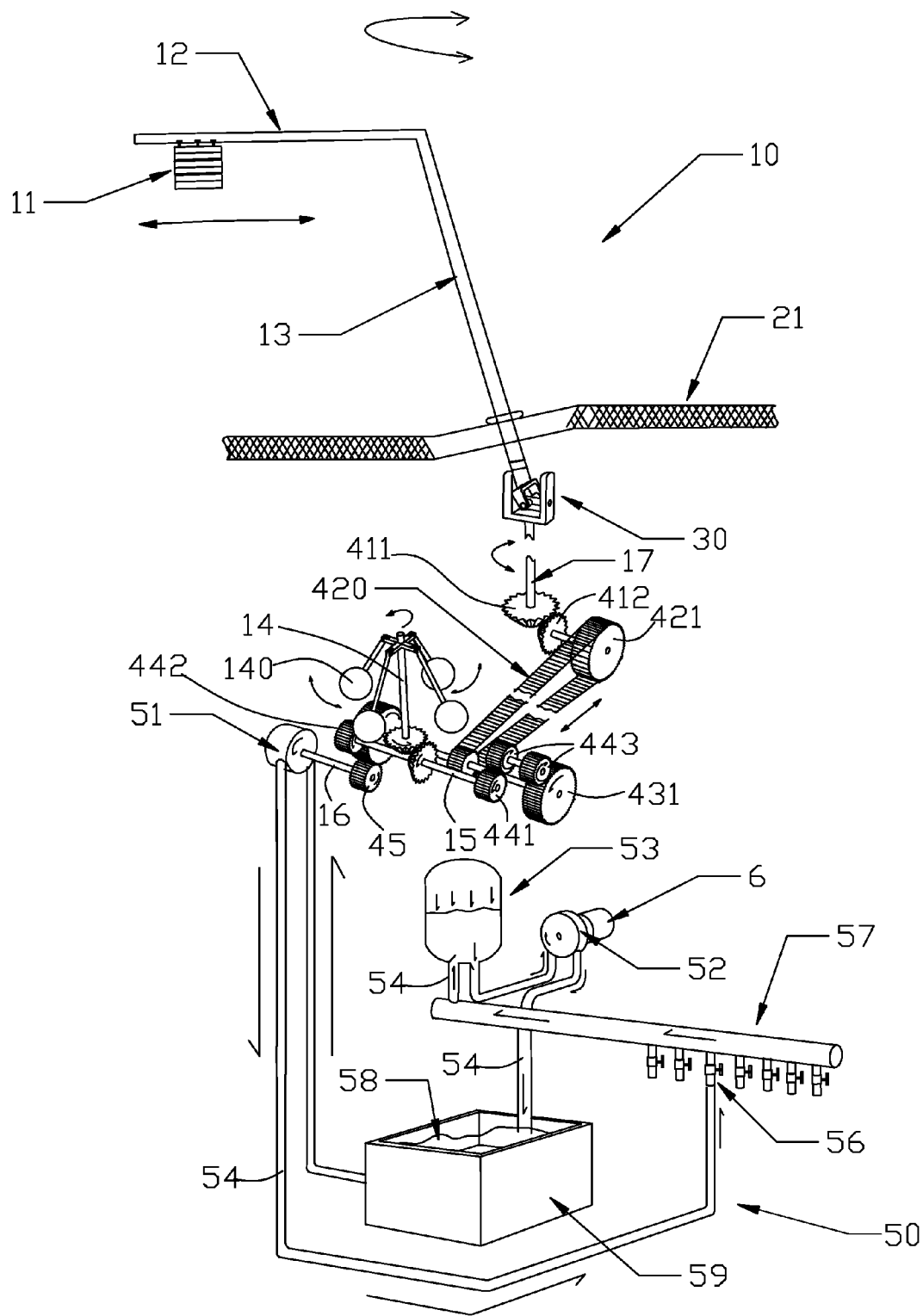
FIG. 2 is an illustrative diagram of the structural detail of the wave powered generator according to a first embodiment of the present application.
Figure 3:
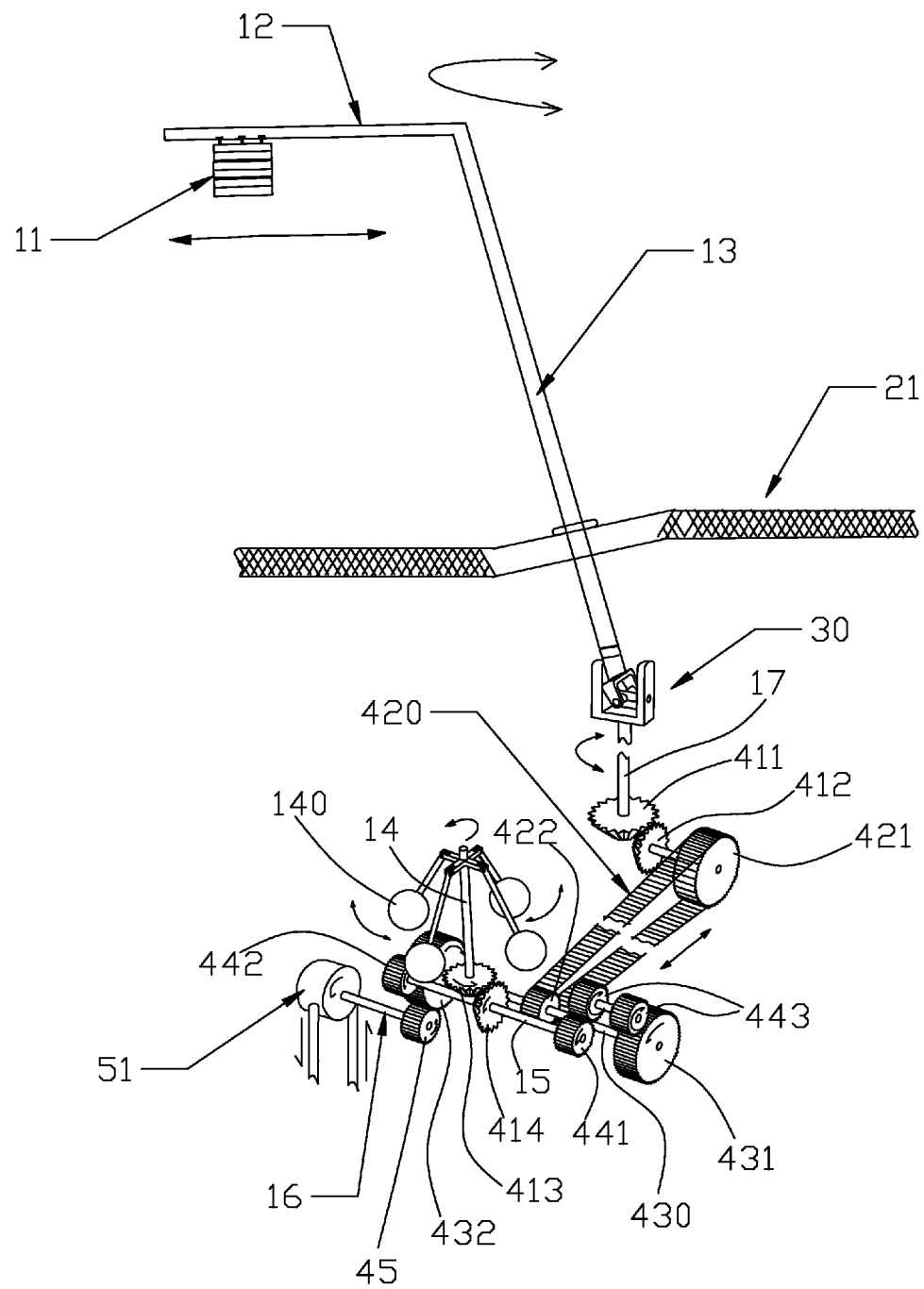
FIG. 3 is an illustrative diagram of a laterally swaying pendulum supported by an upstanding post delivering momentum of the pendulum to a centrifugal flywheel via a transmission gear driving a hydraulic pump to operate with reference to FIG. 2.

As depicted in FIGS. 2 and 3, a foot of the upstanding post 13 may extend and couple with a universal coupler 30 to deliver momentum of pendulum 11 to bevel gear 411 via transmission shaft 17. Bevel gear 412 being meshed with bevel gear 411 transfers the momentum to cause a pair of driving gears 421 and 422 to rotate freely via chain belt 420. The momentum of gear 422 is then delivered to a pair of ratchet gears 431 and 432 one each at the opposite sides of gear 422 via common shaft 430. The operation of the pair of ratchet gears 431 and 432 delivers the momentum to gears 441 and 442 via gears 443 and ratchet gear 432 driving gear 45 via ratchet gear 432 and bevel gear 414 to run directionally in turn driving hydraulic pump 51 to operate via shaft 16 coupled to output gear 45. While gear 441 and gear 442 being coupled to common shaft 15 are operating, bevel gear 414 located in the mid-section of shaft 15 also delivers portion of the momentum to another bevel gear 413 thereby transferring the same portion of momentum to shaft 14 on which a plurality of ball-shaped pendulums 140 acting as inertia blocks for storage of energy are pivotally attached thereto, hence forming a centrifugal flywheel system.

Figure 4:
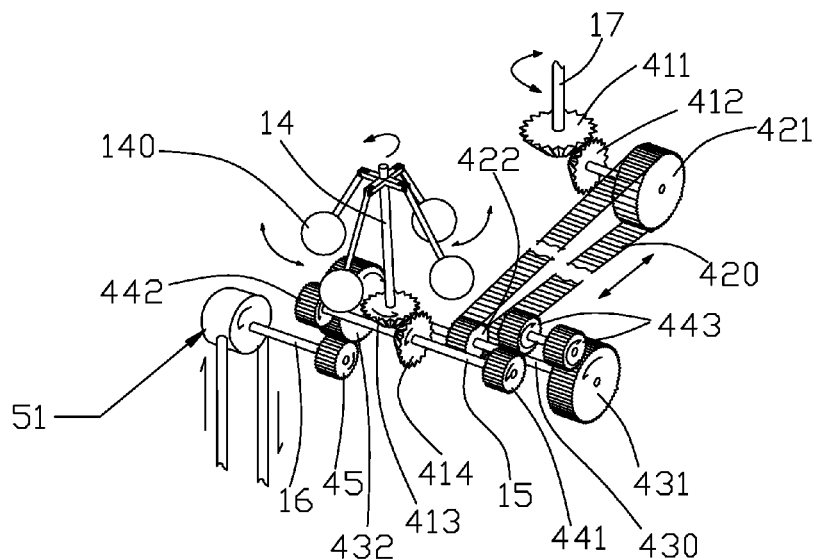
FIG. 4 is an illustrative diagram of a transmission gear incorporating with a centrifugal flywheel of the wave powered generator in FIG. 2.

Referring to FIG. 4, it should be understood that in initial start when shaft 14, bevel gears 413, 414 and all other gear components being idle, the ball-shaped pendulums 140 plumb in parallel to shaft 14. Upon receipt of a sudden torque from bevel gear 414 caused by momentum from pendulum 11, bevel gear 413 is driven to rotate instantly driving shaft 14 and the attached ball-shaped pendulums 140 to spin accordingly. By centrifugal force, the ball-shaped pendulums 140 are caused to gradually spin away from shaft 14 as spinning speed increases thereby a centrifugal flywheel system is formed storing energy in the form of momentum in the spinning ball-shaped pendulums 140, which is analogous to the inertia block of a traditional flywheel. The apparent advantage of a centrifugal flywheel system in the application is that it has a much less resistance in acceleration in comparison with traditional flywheel systems, thereby assuring prompt response in acceleration with much less wear and tear to mechanism for more reliable performance.

Figure 5:
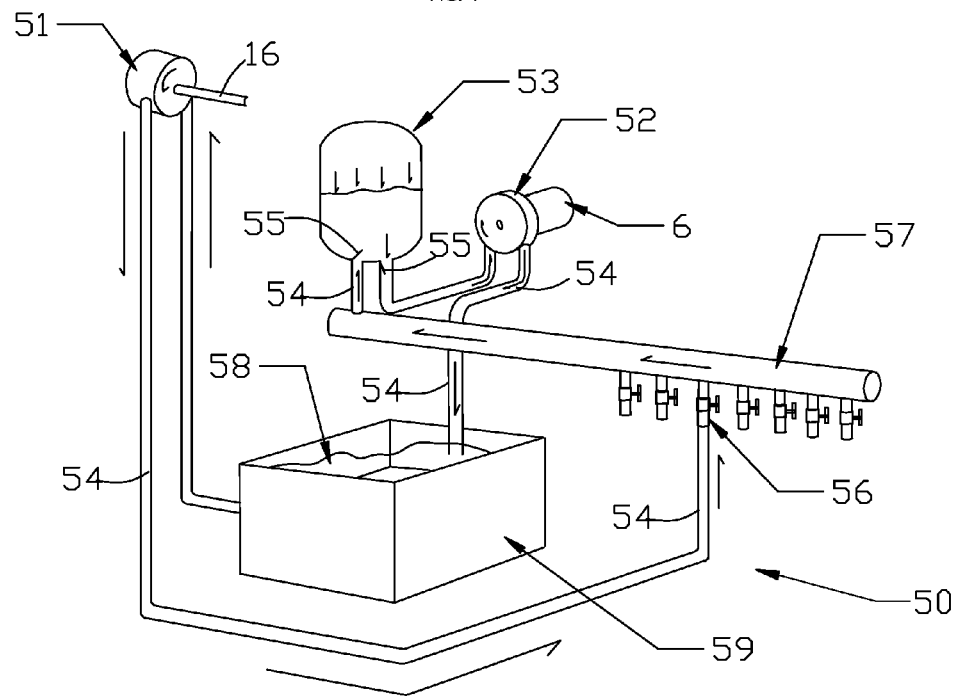
FIG. 5 is an illustrative diagram of a hydraulic powered generator system of the wave power generator in FIG. 2.

Referring to FIGS. 2 and 5 of the present embodiment, the power generating mechanism is a hydraulic power generating mechanism 50 which may include a hydraulic oil tank 59, a hydraulic pump 51, a plurality of hydraulic oil input ports 56 capable of receiving pressurized hydraulic oil from various hydraulic pumps, a hydraulic header pipe 57, a hydraulic pressure vessel 53, a hydraulic turbine 52 coupled to an electrical generator 6, and hydraulic oil delivery pipes 54. When the momentum of pendulum 11 is delivered to gear 45, the energy is transferred to drive hydraulic pump 51 via shaft 16. The pressurized hydraulic oil 58 generated by hydraulic pump 51 is fed to hydraulic pressure vessel 53 through hydraulic oil delivery pipe 54, hydraulic input port 56 and header pipe 57. Hydraulic pressure vessel 53 acts as a reservoir to store energy in the pressurized hydraulic oil 58 as well as an absorber to smoothen pressure surges in hydraulic oil 58 prior to discharging hydraulic oil 58 through hydraulic turbine 52 to drive electrical generator 6 for power generation via hydraulic oil delivery pipe 54 before returning to hydraulic oil tank 59.

The above is a description of the structure of the first embodiment of the wave power generator of the present application. Below is a description of the operation of the wave power generator of the present application with reference to the drawings.

Referring to FIGS. 1 to 5, 9a and 9b, the floating wave powered generator vessel 20 moves up and down in undulating waves changing the center of gravity of pendulums 11 abruptly. Pendulums 11 always lean towards the sunken side of vessel 20 seeking for lowest center of gravity in a wave trough and vice versa in a wave crest thereby each pendulum 11 is caused to sway laterally relatively to the axis of the supporting upstanding post 13 erected above platform deck 21. As pendulum 11 moving around, its momentum being a combination of kinetic energy and potential difference is delivered to a universal coupler 30 via shaft 17 in turn driving a pair of bevel gears 411 and 412 to operate; a pair of driving gears 421 and 422 inter-connected via chain belt 420 is caused to rotate freely as bevel gear 421 rotates. The momentum of gear 422 is then delivered to a pair of ratchet gears 431 and 432 one each at the opposite sides of gear 422 on common shaft 430. The operation of the pair of ratchet gears 431 and 432 delivers the momentum to gears 443, 422, 442, 432, bevel gear 414 and gear 45 respectively, assuring them to rotate directionally driving hydraulic pump 51 to operate via shaft 16. While gear 441 and gear 442 are running on common shaft 15, bevel gear 414 located in the mid-section on shaft 15 also delivers portion of the momentum to another bevel gear 413 thereby transferring the same portion of momentum to drive shaft 14 on which a plurality of ball-shaped pendulums 140 are pivotally connected thereto, serving as inertia blocks for storage of energy. As such, a centrifugal flywheel system is developed and its stored momentum can be fed back to gears 441 and 442 in turn driving ratchet gear 442 and output gear 45 to rotate smoothly and directionally. The directional rotation of output gear 45 in turn drives hydraulic pump 51 to operate via shaft 16 coupling to gear 45; the pressurized hydraulic oil 58 generated by hydraulic pump 51 is fed to hydraulic pressure vessel 53 through hydraulic oil delivery pipe 54, hydraulic input port 56 and header pipe 57. Hydraulic pressure vessel 53 acts as a reservoir to store energy in the pressurized hydraulic oil 58 as well as an absorber to smoothen pressure surges in hydraulic oil 58 prior to discharging hydraulic oil 58 through hydraulic turbine 52 to drive electrical generator 6 for power generation via hydraulic oil delivery pipe 54 before returning to hydraulic oil storage tank 59.

Figure 6:
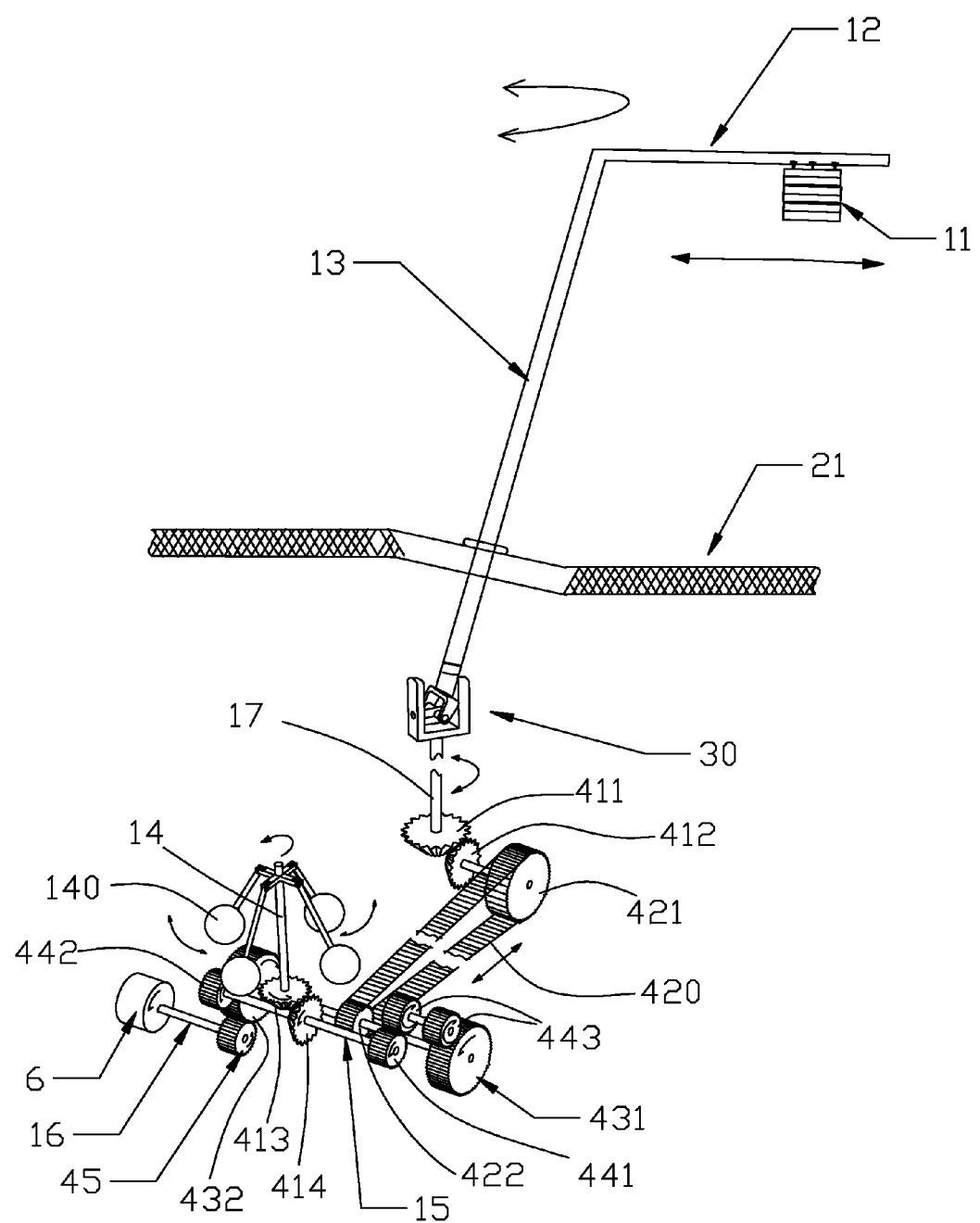
FIG. 6 is an illustrative diagram of an electrical generator directly coupling with the output shaft of the transmission gear mechanism according to a second embodiment of the present application.

FIG. 6 is an illustrative diagram of a second embodiment of the wave power generator of the present application. In this embodiment, the composing elements are the same as those in the first embodiment except that an electrical generator 6 is used to substitute hydraulic pump 51. In the second embodiment, the momentum of pendulum 11 can be delivered to output gear 45 to ultimately drive electrical generator 6 via universal coupler 30, transmission shaft 17, bevel gears 411 and 412, driving gears 421, 422 and chain belt 420, ratchet gears 431 and 432 in operation with a centrifugal flywheel system including bevel gears 414, 413 and shaft 14 being coupled with a plurality of pivotally connected ball-shaped pendulums 140.

Figure 7:
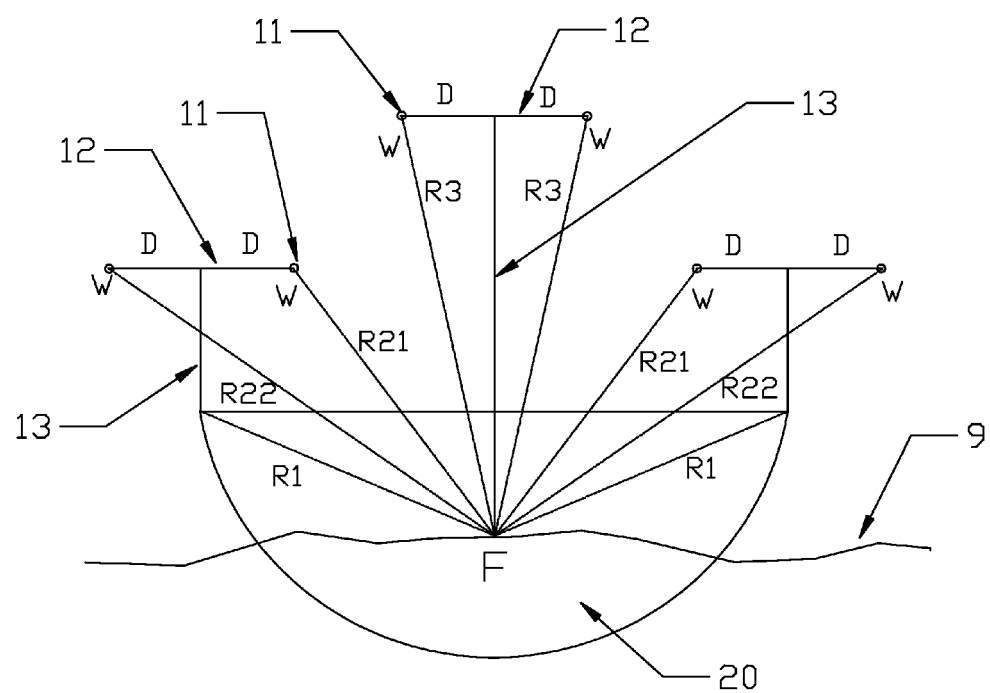
FIG. 7 is an illustrative diagram showing the working principle of the pendulum mechanism of the wave powered generator.

Referring to FIG. 7, it is a diagrammatic presentation showing the relationship of torque, being W weight of pendulum 11 times D the lateral distance to its axis of rotation extended vertically above the axis of an upstanding post 13 erected above a platform deck 21, with respect to a central pivotal point F of vessel 20 around which the vessel sways in undulating waves 9. Assuming D the length of lever arm 12 being a constant, the torque generated by pendulum 11 i.e. W in the application is the same under static situation over various locations on platform deck 21 irrespective to heights of upstanding posts 13. However, the momentums of respective pendulums 11 in one instant are different at various positions of upstanding posts 13 over platform deck 21 as vessel 20 sways. The momentum of pendulum 11 is a combination of energy by virtue of: the potential difference which is insignificant in the calculation, plus the kinetic energy which is functional to the square of the velocity of the moving pendulum 11 i.e. the displacement of pendulums 11 in this application, which is distance R21, R22 and R3 from the central pivotal point F in the diagram. It is apparent from the diagram that the momentum of pendulum 11 is the greatest when an upstanding post 13 is positioned close to the perimeter of vessel 20 and pendulum 11 being supported by a higher upstanding post 13 since the displacement of pendulum 11 will be greater than at any other locations over platform deck 21. In brief, the momentum of pendulum 11 is functional to: the mass of pendulum 11, i.e. W, height of upstanding post 13, length of lever arm D and distance R from the central pivotal point F.

Figure 8:
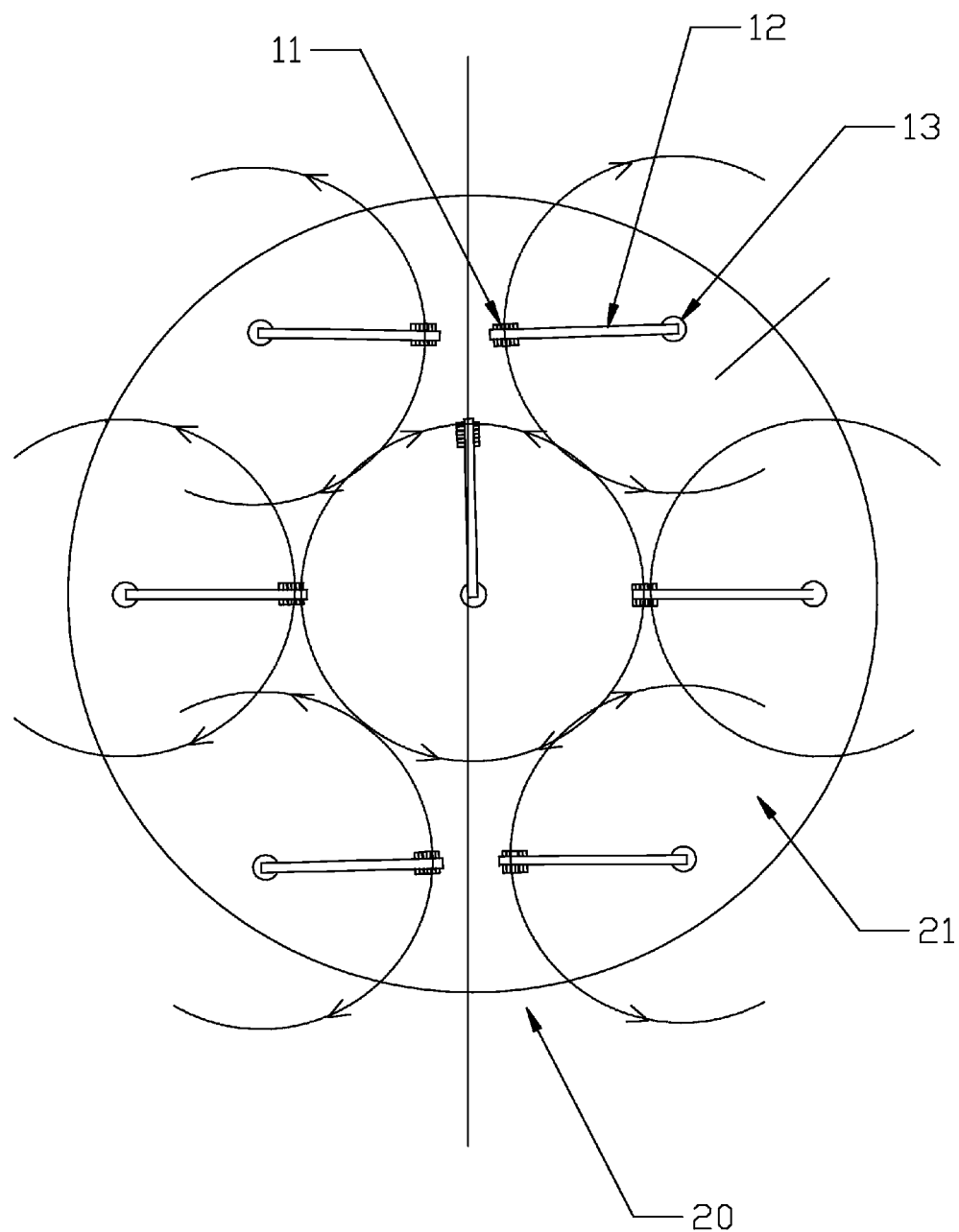
FIG. 8 is an illustrative diagram showing the distribution of the pendulum mechanism over the platform deck of the wave powered generator vessel according to an embodiment of the present application.

FIG. 8 is a plan view of a plurality of pendulums 11 erected by respective upstanding posts 13 distributed over platform deck 21 of vessel 20 with assumption that the heights of vertical posts 13 and the lengths of lever arms 12 are the same for all upstanding posts 13 such that pendulums 11 hung on lever arms 12 being supported by respective upstanding posts 13 will not clash with other neighboring pendulums 11 in any circumstances. In actual application, the heights of neighboring vertical posts are not the same such that the lengths of lever arms 12 can be extended to maximum as long as they do not clash with each other for maximum momentum output.

Figure 9A:
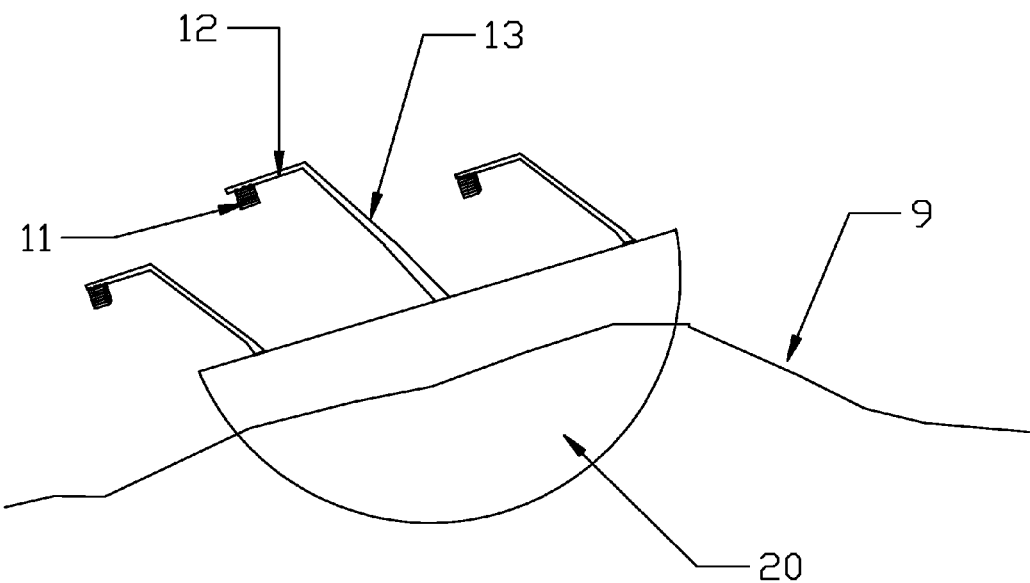
FIGS. 9a and 9b are illustrative diagrams showing a plurality of lateral-swaying pendulums seeking for lowest center of gravity onboard of a wave powered generator vessel under undulating waves.
Figure 9B:
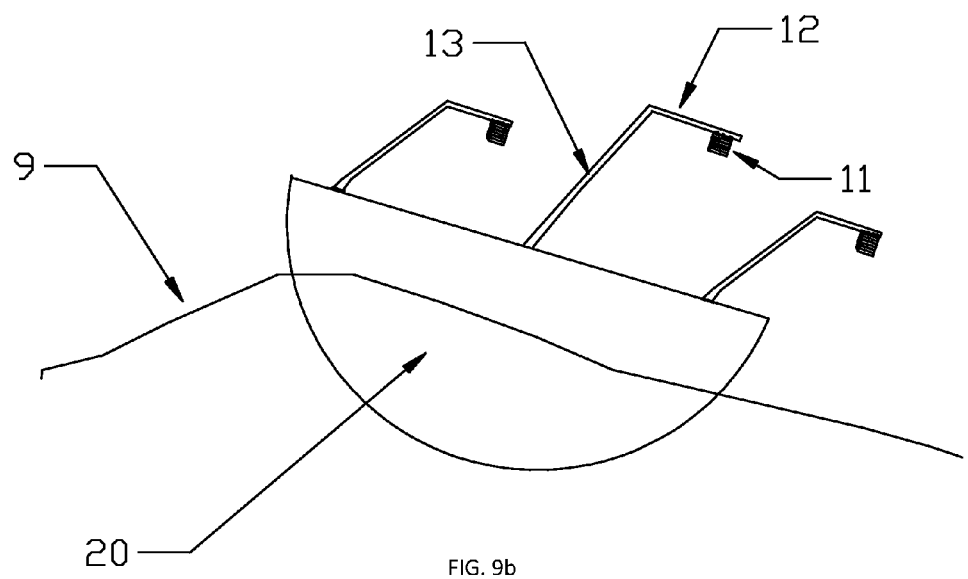

Referring to FIGS. 1, 9a and 9b, the shape of floating wave powered generator vessel 20 may be semi-spherical, which is suitably applicable on non-freezing water surface as it has a wide area of contact with waves such that vessel 20 can harness energy in waves more efficiently.

Figure 10:
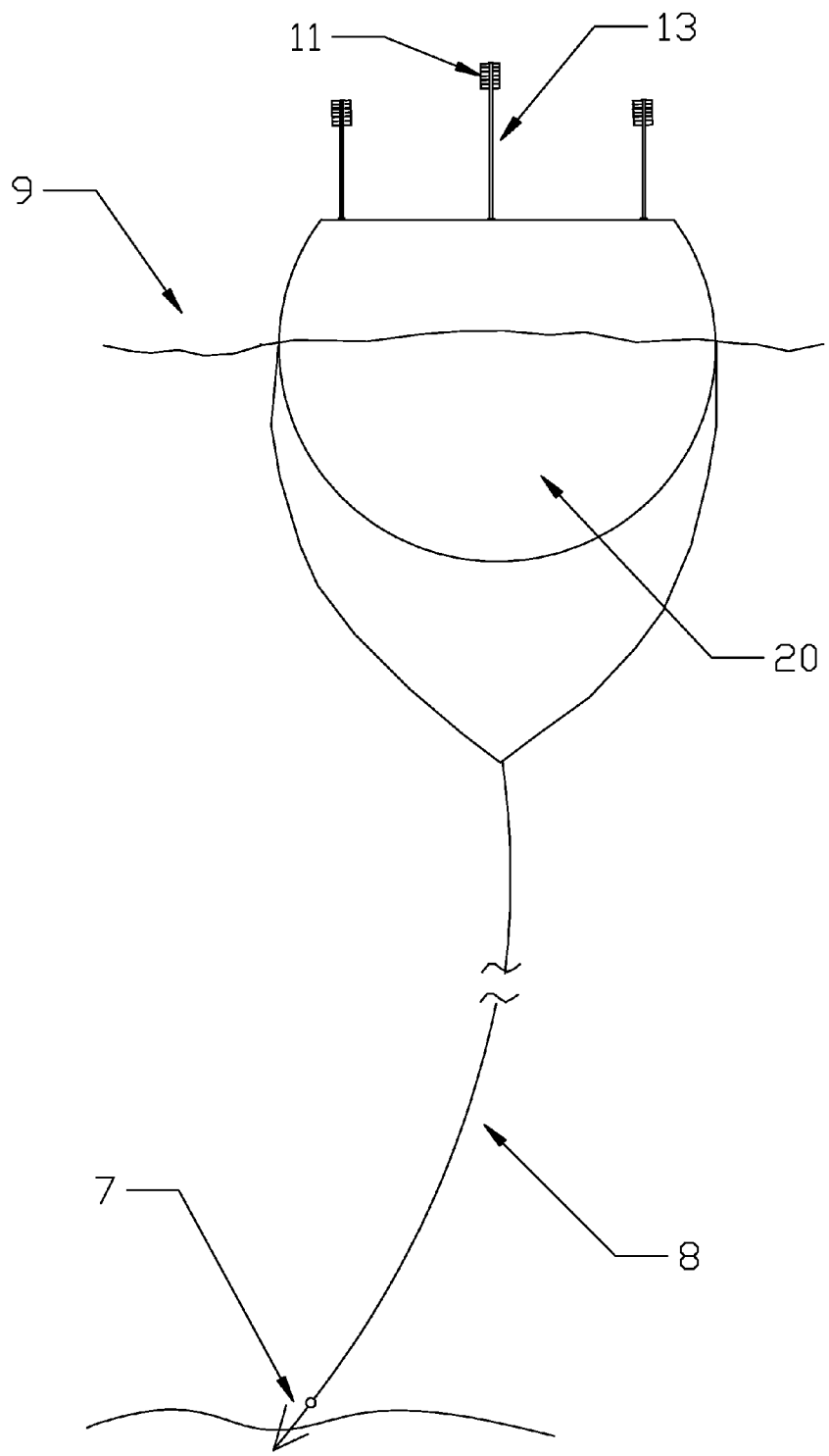
FIG. 10 is an illustrative diagram showing the front view of a floating wave powered generator vessel in the shape of a segmented sphere secured to seabed by an anchor and mooring chain wherein one other end of the mooring chain is split into two sub chains each pivotally connected to the two opposite sides of the vessel along the axis of swaying according to an embodiment of the present application.

In FIG. 10, the floating wave powered generator vessel 20 may be in the shape of a segmented sphere with immersed water line aligned with the diameter of the sphere to achieve minimal water resistance as it sways in undulating waves such that vessel 20 is most suitably applicable on freezing water surface since water around vessel 20 does not freeze easily thereby the floating wave powered generator vessel 20 can work to the last moment till water is deadly frozen. Moreover, one end of a mooring chain 8 can be split into two sub chains connected to two pivotal points one each at the opposite sides of vessel 20 along the axis of swaying for maximum efficiency in harnessing wave energy on account that when anchor 7 is secured to seabed, mooring chain 8 may cause minimal interference to the movement of vessel 20.

Figure 11:
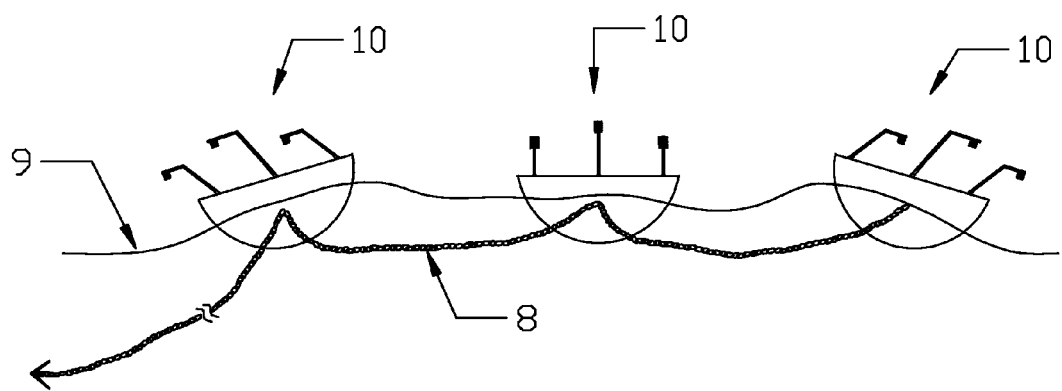
FIG. 11 is an illustrative diagram of a plurality of floating wave powered generator vessels inter-connected together via chain to form a large scale power generating system of the present application.

FIG. 11 is an illustrative diagram of a floating wave powered generating system according to an embodiment of the present application. A plurality of floating wave powered generator vessels 20 being inter-connected via chain 8 and secured to seabed from drifting away via anchor 7 shown in FIG. 10 can be developed to form a system of floating wave powered generator vessels 20.

The wave power generating device 10 of the present application is very sensitive to wave amplitudes as pendulums 11 can sway laterally almost in phase with undulating waves thereby its operation is analogue capable of harnessing energy in waves with amplitudes below 0.5 m, rendering it viable in application on relatively tranquil water surfaces over lakes, rivers and marshes etc.; of course, waves of larger amplitudes can generate more power output. The presence of a plurality of floating wave powered generator vessels 20 in the application does not impose adverse effect on navigation nor environmental impact since its deployment only requires for an anchor 7 and mooring chain 8. The power generated can be fed onshore via underwater cable. The application of a floating wave powered generator vessel 20 is not limited to the above specific applications; it can also serve as a buoy providing power supply to a mooring ship or a power generating device 10 onboard of a ship such that it can provide incessant power supply during cruising and mooring, supplementing or replacing an onboard standby generator. Hence, the invention of the application will have an unlimited market potential worldwide.

Oceans occupy over 70% of earth surface while numerous lakes and rivers scatter over the land. A floating wave powered generator vessel can work all year round on any water surfaces till water is deadly frozen. Due to its simplicity in structure while all device being housed onboard, it has apparent advantages over all the known floating wave powered generator systems in terms of: low equipment cost, minimal maintenance and running costs, convenience in deployment, minimal impact on navigation and environment, invulnerability to stormy conditions due to simple structure, and most of all—reliable power output at all times. For above reasons, a floating wave powered generator vessel 20 of the present application can help promote broad application of distributed energy worldwide thereby reducing emission of carbon dioxide at large.

The above is a description of the embodiments of the present application with reference to the drawings; however, the present application is not limited to the above specific embodiments. The above specific embodiments are merely illustrative in nature, rather than limitative in nature. One skilled in the art, under the motivation from the present application, and without departing from the spirits of the present application and the protection scope of the claims, can perform many other forms, which shall all belong within the scope of protection of the present application.

What is claimed is:

1. A wave power generating device comprising:
    (a) a floating vessel with an onboard pendulum mechanism;
    (b) an anchor with a mooring chain connected with the vessel;
    (c) a lever arm;
    (d) an upstanding post having a tip connected with the lever arm and a foot coupled with a universal coupler;
    (e) a pendulum moveably mounted on the lever arm and being erected above a platform deck of the vessel by the upstanding post;
    (f) a gear mechanism incorporated with a centrifugal flywheel, and coupled with the universal coupler via a transmission mechanism for delivery of momentum of the pendulum; and
    (g) a power generating mechanism driven by the gear mechanism.

2. The wave power generating device according to claim 1, wherein the wave power generating device serves as a buoy capable of providing power to a mooring ship.

3. The wave power generating device according to claim 1, wherein the wave power generating device is operable onboard to provide incessant power supply to a ship at all times during cruising or mooring.

4. The wave power generating device according to claim 1, wherein under undulating waves, the pendulum, being mounted on the lever arm, sways laterally around an axis of the upstanding post, causing the upstanding post to rotate hence delivering the momentum of the pendulum to drive the power generating mechanism via a transmission shaft and the gear mechanism.

5. The wave power generating device according to claim 1, wherein the pendulum comprises layers of counterweight which are stackable, adjustable and moveable on the lever arm for adjustment of momentum output of the pendulum.

6. The wave power generating device according to claim 1, wherein the centrifugal flywheel accelerates more promptly with much less mechanical wear than traditional flywheels.

7. The wave power generating device according to claim 1, comprising a plurality of pendulums each mounted on a lever arm being erected above the platform deck by a plurality of respective upstanding posts; wherein the upstanding posts are distributed over the platform deck at furthest distance from a central pivotal point of the vessel for maximum displacement of the pendulums to enhance efficiency in harnessing wave energy.

8. The wave power generating device according to claim 7, wherein the heights of neighboring upstanding posts are different from each other to avoid lever arms clashing with each other as pendulums sway in seek for lowest center of gravity under undulating waves.

9. The wave power generating device according to claim 1, wherein the power generating mechanism comprises an electrical generator directly coupled with an output shaft of the gear mechanism.

10. The wave power generating device according to claim 1, wherein the power generating mechanism comprises a hydraulic pump coupled with an output shaft of the gear mechanism to drive a hydraulic turbine for power generation.

11. The wave power generating device according to claim 1, wherein the vessel is semi-spherical in shape for larger area of contact with waves for operation in non-freezing water to harness maximum wave energy.

12. The wave power generating device according to claim 1, wherein the vessel is in shape of a segmented sphere for minimal water resistance for operation in region where water surface may be frozen in winter such that the vessel can work in freezing water up to the last moment till water is deadly frozen.

13. The wave power generating device according to claim 1, wherein the anchor is secured to seabed, and one free end of the mooring chain is split into two sub chains connecting to two pivotal points at the two opposite sides of the vessel respectively along an axis around which the vessel sways such that the mooring chain imposes minimal interference to the swaying movement of the vessel for maximum power output.

14. The wave power generating device according to claim 1, comprising a plurality of floating vessels inter-connected via a chain to form a large scale power generating system.

* * * * *